Jan. 2, 1934.   J. L. ADAMS, JR   1,941,526
INDUCTION WELDER
Filed April 11, 1932    5 Sheets-Sheet 3

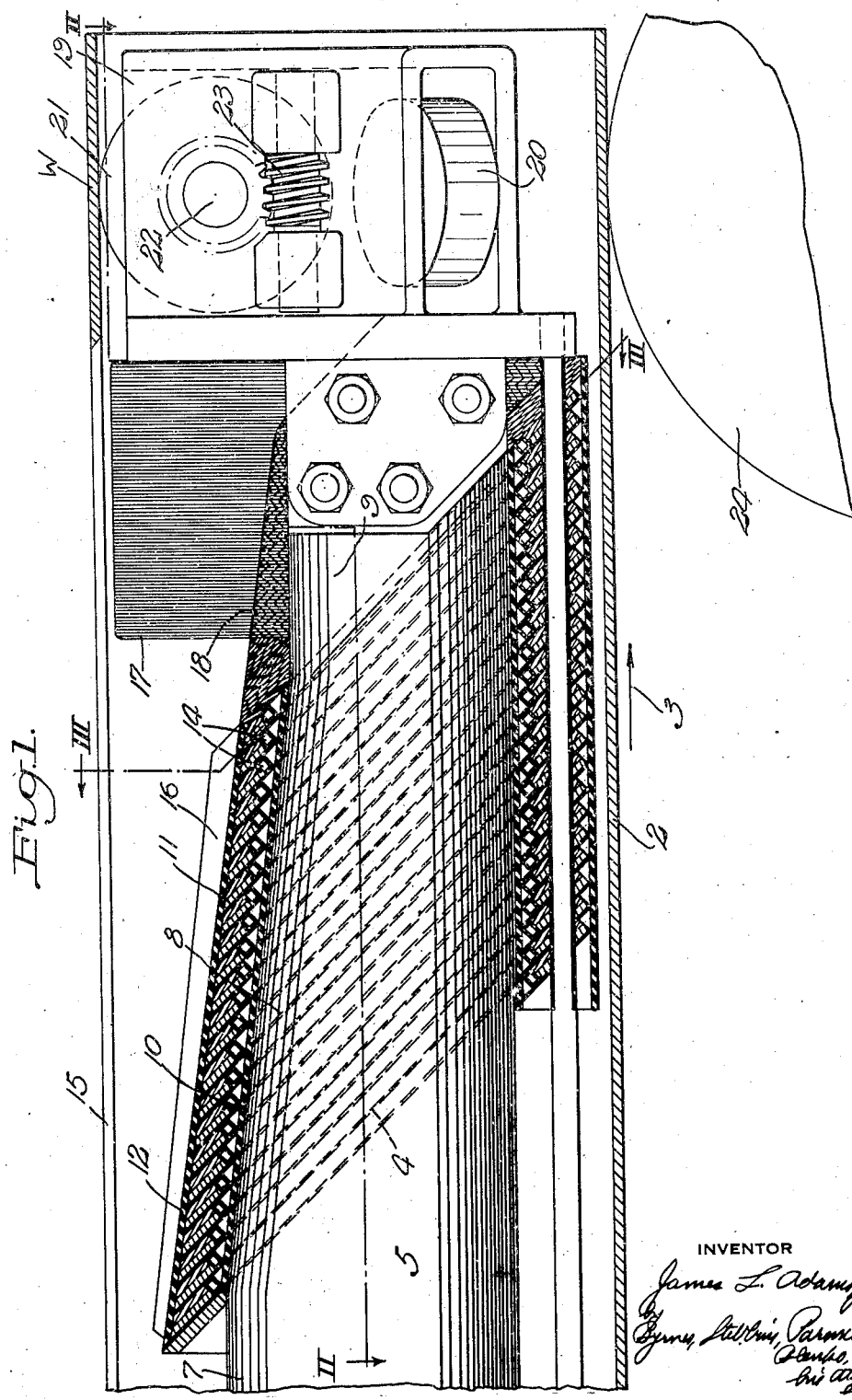

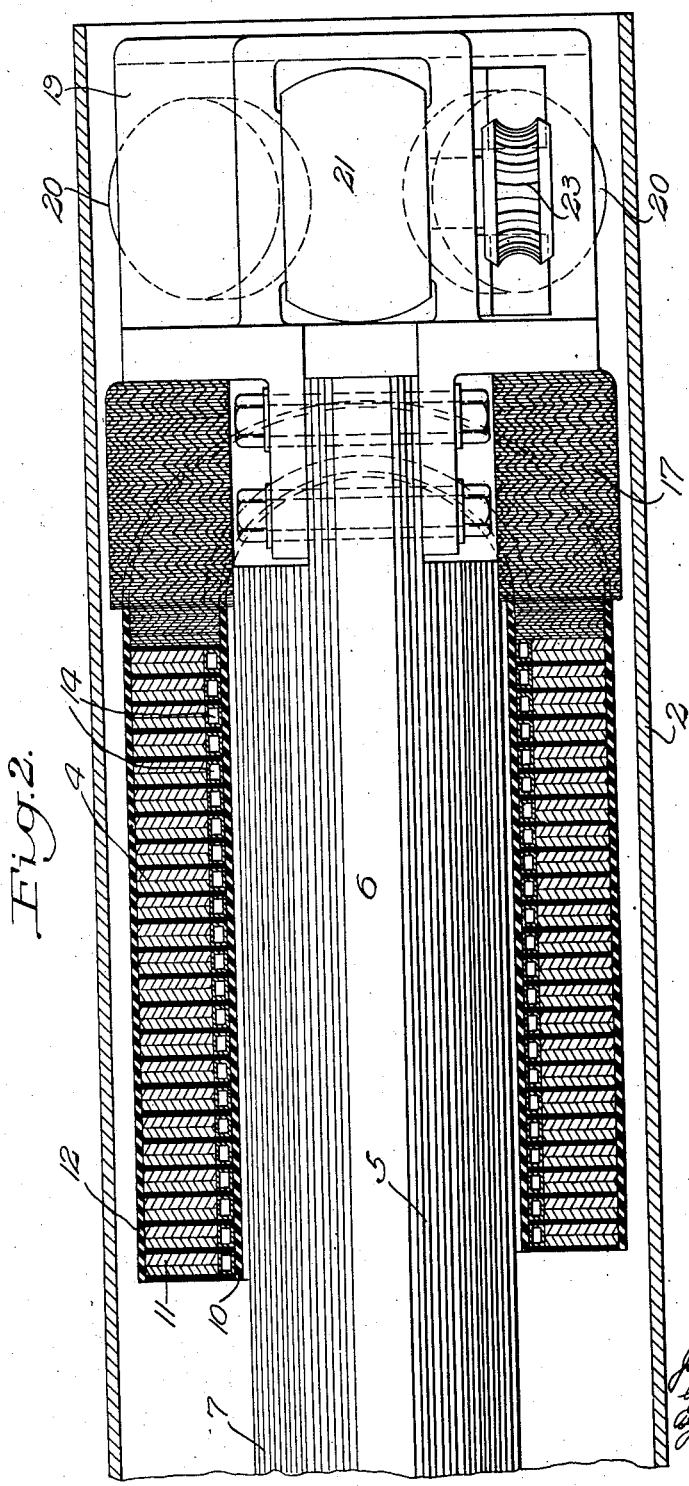

INVENTOR
James L. Adams Jr.
by
his attys.

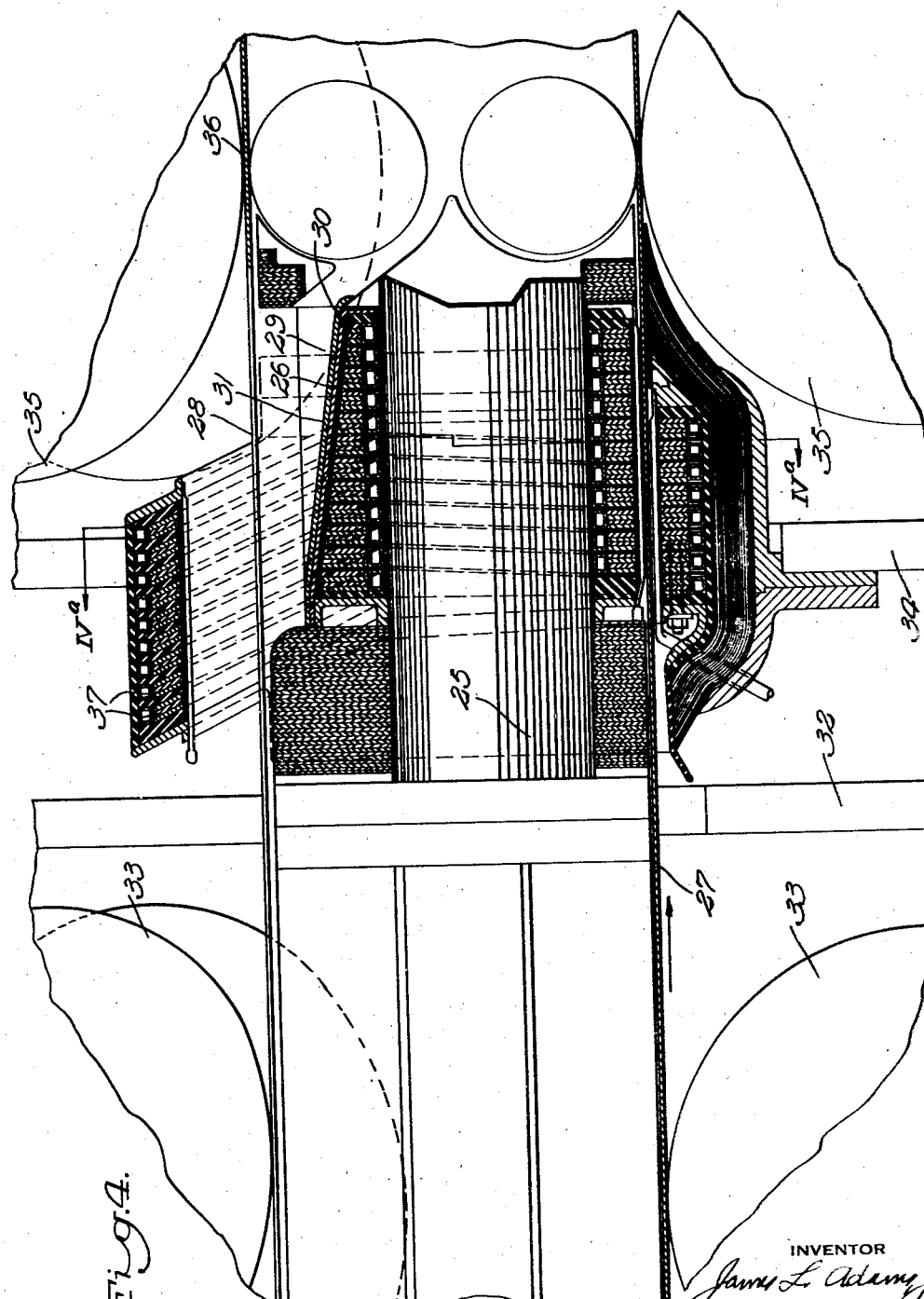

Jan. 2, 1934.  J. L. ADAMS, JR  1,941,526
INDUCTION WELDER
Filed April 11, 1932  5 Sheets-Sheet 5

INVENTOR
James L. Adams, Jr.,
by Byrnes, Stebbins, Parmelee & Blenko,
his Attys.

UNITED STATES PATENT OFFICE 1,941,526

INDUCTION WELDER

James L. Adams, Jr., Youngstown, Ohio, assignor to The Youngstown Sheet and Tube Company, Youngstown, Ohio, a corporation of Ohio Application April 11, 1932. Serial No. 604,518

19 Claims. (Cl. 219—6)

The present invention relates broadly to the art of welding, and more particularly to that phase of the art dealing with the induction welding of substantially tubular objects such, for example, as pipes. Unless otherwise limited, however, it is to be understood that the term "tubular" is utilized in its generic sense as including not only cylindrical objects, but also objects of irregular, polygonal or similar cross section.

In induction welding, and particularly in machine welding of the character adapted to effect continuous welding throughout the length of a tubular article, it is advisable to so construct and mount the current inducing coil as to bring it in general as close to the object throughout as much of the area of the coil as is possible. It is also desirable that the coil be located as far forwardly toward the final welding position as the design of the welding apparatus will permit.

A coil location answering the above characteristics while being extremely desirable from the standpoint of the current induced in the article being welded, is open to operating objections unless special provision is made to compensate for such conditions. For example, along the seam in the tubular object, and especially near the welding position, there exists an extremely hot zone. Due to the temperature of this zone it is necessary, entirely from the standpoint of practical considerations, to space the coil from the article in or adjacent such extremely hot areas, even though such spacing results in cutting down to some extent the total energy input into the article being welded.

It has heretofore been proposed in the art to which the present invention relates to accomplish such spacing in three distinctive manners utilized either individually or in combination. In some cases the coil turns have been made more or less D-shaped, with the flat or substantially flat side of the D opposite the hot belt of the seam. In other cases, the desired spacing has been accomplished by initially forming a round coil and subsequently machining off a portion of one side thereof to the extent desired. In still other cases a round coil has been wound with a slightly reduced outside diameter, and then mounted eccentrically within the article being welded so as to provide materially greater spacing from the seam side of the article than from the opposite side thereof.

While all of the foregoing types of structures have given superior results, I have found that an appreciable portion of the copper of the coil is still located immediately under the hottest belt of the seam, even though it is somewhat more distant from the seam than from the remainder of the surface of the article being welded. Such constructions have also been open to the objection that they do not enable the coil to be as far forward toward the welding zone as is desirable from the standpoint of energy transfer.

The present invention has for one of its objects the provision of an improved coil structure for welding apparatus of the general character referred to, characterized by the desired proximity between a substantial portion of the coil area and the surface of the article being welded and by the disposition of the coil area well forward toward the final welding position.

For purposes of a general understanding of the general type of welding apparatus to which my invention is adaptable, reference may be had to my French Patent No. 751,039 of April 10, 1931, although the utility of the invention is not limited to the constructional characteristics of the main portion of the welding apparatus itself.

In the accompanying drawings I have shown for purposes of illustration only, those portions of an induction welding apparatus to which my invention particularly relates. In the drawings—

Figure 1 is a view partly in longitudinal section through one form of welding apparatus constructed in accordance with the present invention;

Figure 2 is a longitudinal sectional view on the line II—II of Figure 1, looking in the direction of the arrows;

Figure 4 is a view similar to Figure 1, illustrating a slightly modified embodiment of the invention;

As the invention becomes better understood by reference to the accompanying drawings, it will be noted that each form of the invention is characterized by having a portion or all of each turn of either one or both of the coils built in accordance with my invention extending at an inclination to a plane transverse to the coil axis, the inclination preferably being of the character obtained by sloping a portion or all of each turn rearwardly away from welding position in the region adjacent the hot belt of the seam. This inclination or sloping not only enables the desired spaced relationship to be obtained between the hot belt of the seam and the portion of the coil adjacent thereto, but enables a substantial portion of the opposite side of the coil to be located well forwardly toward the welding position in such manner that the axially directed component of the induced current flow paths through the metal of the article being welded is materially shortened, thereby cutting down resistance and magnetic leakage in such secondary paths and therefore increasing the current flow through such paths and the energy concentration at the seam where the edges are brought together. Such a structure also insures a minimum of time after the maximum heating has been accomplished before the weld is consolidated by the application of welding pressure, thus overcoming the tendency toward spotty, half completed, or lost welds, and also permitting welding closer to ends of the tube. The great relative importance of the reduction of the end-scrap loss will be evident, when it is stated that on my very early tests, before the means for overcoming this factor had been worked out, the end-scrap loss exceeded all other costs of the welding, put together.

Figure 3:
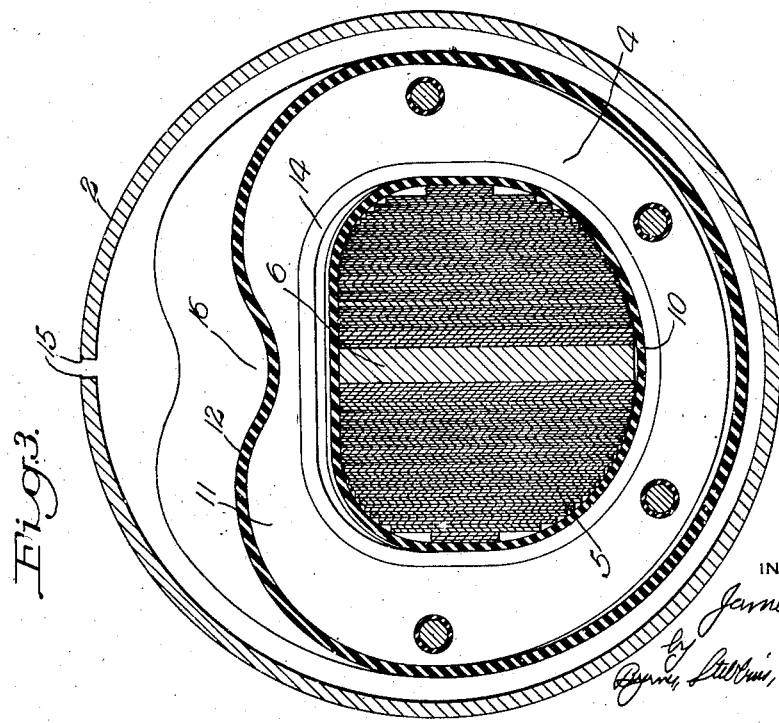
Figure 3 is a transverse sectional view on the line III—III of Figure 1, looking in the direction of the arrows.

By reference more particularly to Figures 1 to 3 of the drawings, it will be found that I have shown a tubular article 2 to be welded, it being assumed that this article is continuously travelling in the direction of the arrow 3 in Figure 1. During this travel the article bodily passes over an inner coil and core asembly 4, not infrequently referred to as a torpedo. This torpedo is characterized by a core 5 suitably laminated as apparent more particularly from Figures 2 and 3, with the laminations supported or stiffened in suitable manner as by a longitudinally extending beam, or plate 6.

By reference to Figure 1, it will be noted that the core comprises a substantially cylindrical portion 7, adjacent the left hand side of the figure as viewed in Figure 1, a tapered intermediate portion 8 of generally D-shaped cross section as shown in Figure 3, and a terminal portion 9 of constant cross sectional area but generally D-shaped in cross section. The tapered intermediate portion 8 is formed by gradually cutting away a portion of the laminations on one side only of the core. Around this portion there is provided a sleeve 10 of insulation around which extends a coil 11. Surrounding this coil is a protective covering 12 which may be of insulating material, or which may comprise a combined insulating armoring and water cooled protective casing for the coil.

The coil itself is characterized by a series of turns or windings each preferably comprising one or more strips or bars edgewise wound with the windings at the portions remote from the tubular article 2 cooperating with a water cooling duct 14. It will be noted that the turns of the windings lie in planes inclined with respect to the coil axis, the upper portion of the coil sloping rearwardly toward the direction from which the article being welded is advanced.

In Figures 1 and 3 the article is shown as so positioned that the edges 15 to be welded overlie that portion of the coil which is most remote from the inner surface of the tubular article. Such a relationship of parts is preferred in the case of a top weld. If a weld is to be formed at the bottom, or at one side, the torpedo will be correspondingly rotated, it being desirable at all times that the maximum spacing will exist between the hot belt of the seam and the coil periphery.

By reference to Figure 3, it will be noted that not only is the core itself of D-shaped cross section, but that the windings of the coil are cut away to provide a trough 16 directly underlying the seam in the case of a top weld, and generally in the radial plane of the seam regardless of the disposition of parts, with the base of the trough gradually sloping downwardly and forwardly with respect to the direction of travel of the material being welded.

To those skilled in the art it will be apparent that the material being welded constitutes a single turn secondary for the coil. As the material gradually travels forwardly over the coil its temperature will be raised. As the temperature increases, the spacing of the portion of the coil adjacent the hot belt of the seam likewise increases. The coil structure may be made up in a variety of ways, but one of my preferred methods for producing this coil is to wind the annealed copper turns edgewise upon a suitable extensible mandrel form having spirally turned relatively deep narrow slots therein to just fit the copper strap or bar snugly, and to hold it edgewise in place with sufficient rigidity to prevent its thickening up materially at the inner radius positions. After winding all, or a convenient fraction of the total number of turns, a suitable end nut on the mandrel may be well loosened and the spiral sprung or pulled well open so as to free the developed part of the winding which may then be screwed out of the mandrel either completely or else only sufficiently to take care of the next group of turns to be wound, this operation being repeated until the complete coil is formed. Such a grooved mandrel can be readily made to wind round coils, D-shaped or other coils as required, in well annealed soft copper, suitable radii being used for the corners of the D in case the coil is of such cross sectional configuration.

If it were attempted to obtain the desired spacing entirely by cutting down the cross sectional area of the core on one side thereof, too great a crowding of the lines of force would result in the portion of minimum cross sectional area. In accordance with my invention, the core area is decreased as far as the magnetic design will allow. Although this results in a comparatively high crowding of the lines of force at the portion of smallest cross sectional area, there is a fairly rapid increase in the cross section toward the entering end of the core, at which end the core area is more liberal. In practice, flux density can be carried very high for a brief distance along a core, without too great a sacrifice in the way of increased magnetizing current and core losses, provided the rest of the magnetic circuit is liberally designed as in the construction referred to.

By the tapering of the core, the contour of the windings or coil turns and the troughing of the coil, there is not only provided a construction in which the copper of the coil is positioned as far away from the hottest belt of the seam being welded as possible, but there is provided a construction which will accommodate, if desired, a flushing stream of water which may be delivered to the left hand end of the trough as viewed in Figure 1 so as to flow downwardly through the trough immediately under the seam. Of course such a water flow is possible only in the case of a top seam, but a sloping jet might be used if the seam is below. With such a water flow, however, I am enabled to get such fraction of the "spittings" as are thrown off toward the coil from the hot belt, so cooled off before they come into contact with anything except air and water, that they reach the bottom of the flushing trough as separated granules, and not as a solidly adherent tough metal mass which must be periodically manually chiseled away from the torpedo.

This granulated or granular-like material will be carried out as produced, by the water flow, so as to leave the welding machine along with the material being welded. In case the water flow is to be utilized, the entire welder axis, or longitudinal axis of the tubular material will preferably be given a slight dip in a forward direction sufficient to preclude the possibility of the flushing water tending to back up into the machine and its windings.

While the central troughing of the copper along the top portion of each turn materially increases the distance from the bottom of the trough to the seam, it does not greatly add to the total resistance or heating effect of the coil, since the cut lasts for too brief a fraction of the total turn length, and ample copper exists on each side of the cut to carry off the slight additional heat.

Cooperating with the portion 9 of the core is a pole piece 17 of laminated construction, the laminations being cut away to form a slot 18 in line with the trough 16.

Carried by the torpedo at its free end is a mounting 19 within which are carried relatively fixed inner welding or mandrel rolls 20 and an upper roll 21 having an axis 22 eccentric to the roll periphery whereby adjustment inwardly or outwardly of the roll 21 may be obtained by rotating the axis 22 through the medium of a worm 23.

In Figure 1 of the drawings, I have illustrated one of a group of outer welding rolls 24, which rolls are positioned around the material 2 in such manner as to bring the spaced edges 15 thereof into contact and form a weld as indicated at W in Figure 1. This figure does not disclose any form of outside coil, it being contemplated that the inner coil may be utilized to the exclusion of an outer coil, or that it may be utilized with an outer coil of any desired cross sectional area.

In Figure 4 of the drawings there is shown a slightly modified embodiment of the invention wherein the laminated portion 25 of the core is shown as being of substantially constant cross sectional area having a winding 26 therearound. This winding, while shown as comprising turns which are substantially normal to the axis of the material 27 being welded, are shown as cut away below the seam edges 28 to provide a trough 29 similar to the trough heretofore described. The trough in this case is shown as having not only a protective and waterproofing intermediate covering 30, but also an outer metallic sheathing 31. This outer sheathing preferably comprises a high resistance metal such as "Monel" metal, or a suitable non-magnetic alloy steel such as "Ascoloy" or the like, the covering being subdivided or open-circuited at a suitable point or preferably a multiplicity of points around the torpedo. While such water protective metal coverings will get fairly hot at the portions away from the water channel, by making the covering sufficiently thin, the total losses therein will be small compared to the welding load and therefore negligible, and they can be made water-cooled here, if preferred.

In this figure, I have shown an entering stand 32 containing entering rolls 33 usually referred to as crushing rolls and effective for preliminarily sizing the material, and a welding stand 34 containing welding rolls 35 for applying the desired welding pressure to the material so as to bring the edges thereof together and form a weld 36.

Intermediate the stands 32 and 34, and around the material 27 is an outer coil herein illustrated as comprising a plurality of windings 37, which windings throughout a portion of each turn are substantially normal to the axis of travel of the material being welded, and throughout the remainder of each turn are inclined backwardly as clearly apparent from the drawings. By reason of this construction it will be apparent that the outer coil may be placed so that a portion thereof lies well forward toward the welding zone defined by the welding rolls 35, thus cutting down to a minimum the axially directed component of the induced current flow paths through the material as before referred to, and obviating the possibility of spotty, partially completed, or lost welds.

Figure 5:
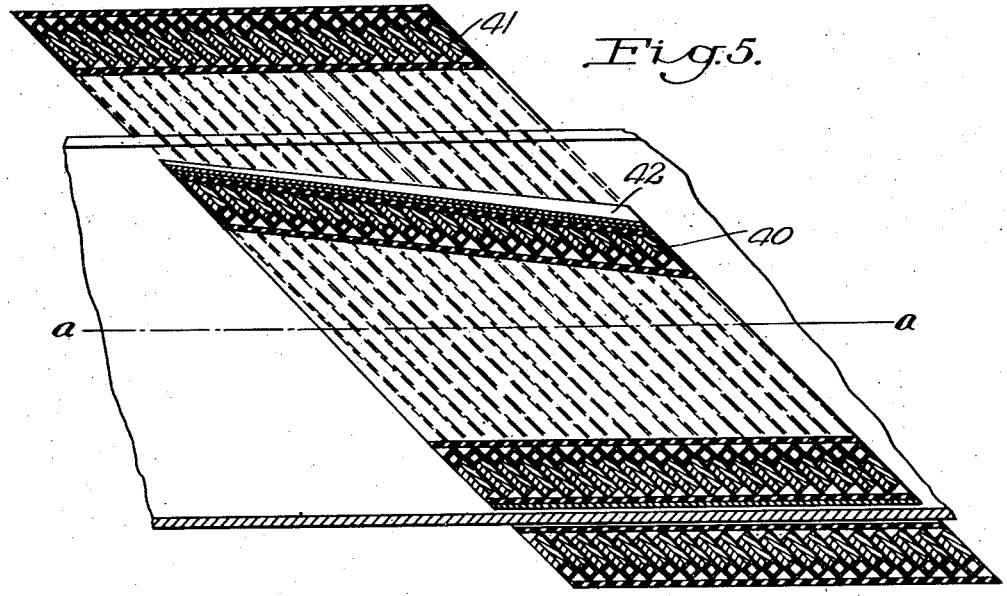
Figure 5 is a diagrammatic view illustrating still another form of coil construction.

In Figure 5, I have illustrated diagrammatically an inner coil 40 having all of the windings inclined to the coil axis $a$—$a$ with an outer coil 41 having all of its windings generally inclined. The inner coil is shown as being of generally D-shaped cross section and as having a trough 42 formed therein.

Figure 6:
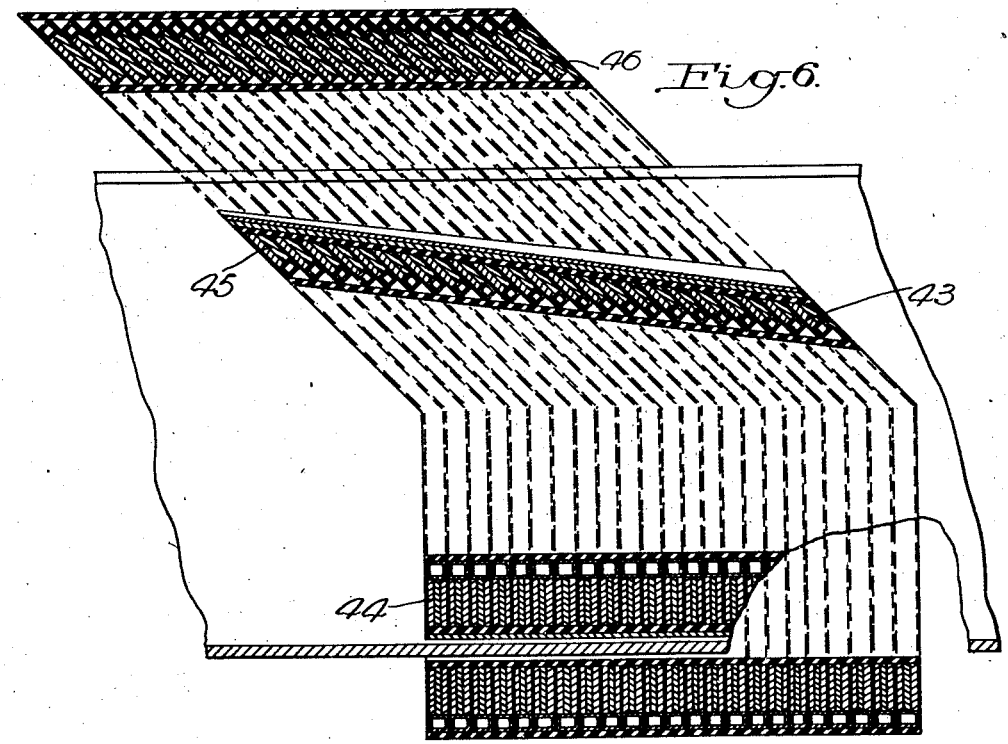
Figure 6 is a view similar to Figures 4 and 5 showing still another embodiment of the invention.

In Figure 6 there is shown an inner coil 43 with the bottom half 44 of each coil turn lying in a plane substantially normal to the axis of the material being welded, and the upper half 45 of each coil turn sloped rearwardly, similarly to the outer coil of Figure 4. Cooperating with this inner coil is a similarly shaped outer coil 46 corresponding to the outer coil of Figure 4. The inner and outer coils of Figure 6 are characterized by having the perpendicular portions of each winding formed of three bars, for example, in parallel, while the sloping part of each coil comprises but two bars in parallel. Preferably the two bars are somewhat wider than the three bars to partially compensate for the area loss in the sloping portion of the coil. Such a construction, while not essential, gives the desired compactness to the entire coil structure.

In designing, for example, a 400 volt 60 cycle A. C. welder for 20 inch pipe size and ¼" to ⅜" thick stock, two coils of the character shown may have together a total of approximately 15 to 20 turns, each ¾" to 1" thick by say 1¼" wide with the turns all solidly bolted together, whereby it is easy to machine each coil as a unit to provide a trough therein. Such a pair of coils can be made to give an output to the welder of from 1000 to 1500 kilowatts. It is thus apparent that the mass and bulk of the winding in a device of the character described is remarkably small compared to other devices such as transformers, having equal capacity, and that the output per turn is very high.

Figure 4A:
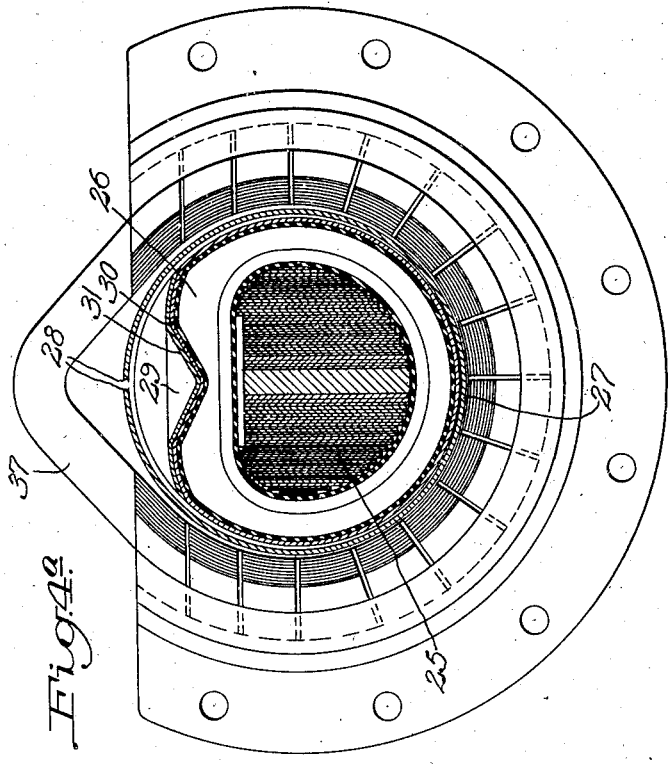
Figure 4a is a sectional view on the line IVa—IVa of Figure 4.

By reference more particularly to Figures 4 and 4a of the drawings, it will be noted that the outer coil is characterized by having its turns formed with a loop above the seam edges, thereby providing what may be termed an inverted trough in the outer coil adjacent the hot belt of the seam and functioning somewhat similarly to the trough in the inner coil.

In Figure 1 of the drawings there is illustrated a seam closing operation of such nature that the outer edge of the seam contacts first, while in Figure 4 the closing is indicated as being of such nature that the inner edge of the seam first contacts. In both cases the manner of contact is indicated by an inclined line. While the actual manner of establishing contact is immaterial, it is entirely possible to adjust the parts so as to obtain an initial edge to edge contact of any preferred character.

Certain advantages of the present invention arise from the provision of an inducing coil constituting part of a torpedo or mandrel structure for disposition within a tubular article being welded, and characterized by a trough formed therein adjacent the hot belt of the seam with the bottom of the trough preferably converging toward the axis of the formed-up material in the direction of material travel.

Still further advantages of the invention arise from the provision of a coil of the character referred to of such construction as to permit a water flow thereover adjacent the hot belt of the seam.

Still other advantages of the invention arise from the provision of a coil having a part or all of certain of the turns or windings thereof inclined with respect to the coil axis.

Other important advantages accrue from the provision of a tapering core and coil, the portions of which are spaced farther and farther from the seam as the temperature of the latter is increased to the welding point. In this way, the core and coil are spaced a safe distance from the weld without unduly lengthening the portion of the core of small section which must operate at high magnetic density.

Additional advantages of value result from the provision of a coil, each turn of which has a considerable portion disposed well forward toward the welding point and close to the tube being welded. At the same time, the portions immediately adjacent the hottest portion of the seam are removed from the latter by a substantial distance, preferably to one side in the axial direction of the tube.

While I have herein illustrated and described certain preferred embodiments of the present invention, it will be apparent that changes in the construction, location and operation of the parts, as well as in the manner of forming and mounting the same may be made without departing either from the spirit of the present invention or the scope of my broader claims.

I claim:

1. In an electric induction welder, a core, a primary inducing coil around the core having turns disposed thereon in planes at a substantial inclination to the coil axis, and means for advancing the work to be welded past the core and coil while maintaining the work in electromagnetically linked relation therewith.

2. In an electric induction welder, a core, a primary inducing coil around the core having a portion of its turns disposed thereon in planes at a substantial inclination to the coil axis, and means for advancing the work to be welded past the core and coil while maintaining the work in electromagentically linked relation therewith.

3. In a continuous electric induction welder for seaming axial joints in tubular articles, a core, a primary coil around the core having turns disposed in planes at a substantial inclination to the coil axis, and means for advancing the articles over the core, the portions of said turns adjacent the joint being disposed farther in a direction opposite that of article travel than portions of said turns remote from the joint.

4. In an electric induction welder, an entering roll stand, a welding roll stand, a core, and a current inducing coil therearound intermediate said stands for inducing a current flow in an article passing through said stands, said coil having turns disposed in planes at a subtantial inclination to the coil axis.

5. In an electric induction welder, an entering roll stand, a welding roll stand, a core, and a current inducing coil therearound intermediate said stands for inducing a current flow in an article passing through said stands, said coil having turns with portions thereof disposed in adjacent planes at a substantial inclination to the coil axis.

6. In an electric induction welder, an entering roll stand, a welding roll stand, and a current inducing coil intermediate said stands for inducing a current flow in an article passing through said stands, said coil having a portion of all of its turns mounted to lie at a substantial inclination to the coil axis.

7. In an electric induction welder, an entering roll stand, a welding roll stand, and a current inducing coil intermediate said stands for inducing a current flow in an article passing through said stands, said coil having all of its turns mounted to lie at a substantial inclination to the coil axis.

8. In an electric induction welder, an entering roll stand, a welding roll stand, a core and an inducing coil therearound positioned intermediate said stands, and a second coil cooperating with the core but radially spaced from the first mentioned coil, said coils each having turns with portions thereof at least, disposed in planes at a substantial inclination to the axis of the coil and core assembly.

9. In a continuous electric induction welder, means defining a welding zone, work-advancing means, a core, and a primary coil thereon having turns disposed in planes oblique to the general coil axis thus positioning the portions of said turns adjacent the seam being welded a substantial distance away from the welding zone while positioning the major part of said turns well forward toward the welding zone.

10. In an electric induction welder, a primary inducing coil having current carrying parts set obliquely to the line of weld, and a laminated core for said coil having a sloping portion substantially conforming to the coil contour.

11. In a continuous electric induction welder, a primary inducing coil having current carrying parts set obliquely to the line of the seam being welded to lower the temperature otherwise present in the seam side of such parts while keeping the major portion of the coil close to the metal being welded and well forward toward the transverse zone of pressure welding.

12. In an electric induction welder, primary coils adapted to be excited by periodically varying current and and adapted to lie on opposite sides of the metal being welded, one of said coils having current carrying parts disposed obliquely to the general axis of the coil to dispose such parts away from the more highly heated zones of the weld.

13. In an electric induction welder, a primary coil adapted to be energized from a suitable source of periodically varying current, said coil having current carrying parts set obliquely to the general line of travel of metal plate parts being welded to increase the energy input into said plate parts and the distance of the hottest zone of the weld from the coil.

14. In an electric induction welder, a single layer primary coil having a lesser cross sectional area at the end nearest the welding zone.

15. In an electric induction welder, a core, a primary coil thereon, means for advancing the work to be welded while maintaining it in electromagnetic relation to said core and coil, said core and coil tapering in the direction of work advancement, said coil having at least portions of its turns disposed in planes oblique to the coil axis.

16. In an electric welder of the induction type, an inner coil and core assembly characterized by the provision of a longitudinally extending groove along the exterior of said assembly.

17. In an electric welder of the induction type, an inner inducing coil and core assembly characterized by the provision of a longitudinally extending groove along the exterior of an element of said assembly, said groove having an inclined bottom portion adapted to freely conduct a water flow along the groove in a predetermined direction.

18. In an electric induction welder for substantially tubular articles, an inducing coil and core assembly adapted to extend within a tubular article being welded, and characterized by the provision of a trough in the exterior parts of said assembly extending substantially parallel to the coil axis and more or less substantially transversely to the turns of the coil.

19. In an electric induction welder for substantially tubular articles, an inducing coil and core assembly adapted to extend within a tubular article being welded, and characterized by the provision of a trough in the exterior of said assembly extending substantially parallel to the coil axis and more or less transversely to the turns of the coil, said turns being disposed obliquely to the coil axis.

JAMES L. ADAMS, Jr.